United States Patent
Cuomo et al.

(10) Patent No.: US 12,455,980 B2
(45) Date of Patent: Oct. 28, 2025

(54) LARGE LANGUAGE MODEL PRIVACY PRESERVATION SYSTEM

(71) Applicant: International Business Machines Corporation, Armonk, NY (US)

(72) Inventors: Gennaro Anthony Cuomo, Raleigh, NC (US); Blaine H. Dolph, Western Springs, IL (US); Christopher Hay, Great Horkesley (GB)

(73) Assignee: International Business Machines Corporation, Armonk, NY (US)

( * ) Notice: Subject to any disclaimer, the term of this patent is extended or adjusted under 35 U.S.C. 154(b) by 162 days.

(21) Appl. No.: 18/466,049

(22) Filed: Sep. 13, 2023

(65) Prior Publication Data

US 2025/0086310 A1    Mar. 13, 2025

(51) Int. Cl.
*G06F 21/62*     (2013.01)
*G06F 16/3332*   (2025.01)

(52) U.S. Cl.
CPC ...... *G06F 21/6245* (2013.01); *G06F 16/3335* (2019.01)

(58) Field of Classification Search
CPC ...... G06F 21/60; G06F 21/62; G06F 21/6218; G06F 21/6245; G06F 16/30; G06F 16/33; G06F 16/3331; G06F 16/3332; G06F 16/3335
See application file for complete search history.

(56) References Cited

U.S. PATENT DOCUMENTS

| | | | |
|---|---|---|---|
| 9,767,503 B2 | 9/2017 | Grigg et al. | |
| 10,572,232 B2 | 2/2020 | Liu et al. | |
| 11,212,387 B1 | 12/2021 | Olson et al. | |
| 11,314,933 B2 | 4/2022 | Leme et al. | |
| 11,449,762 B2 | 9/2022 | Rosenstein et al. | |
| 11,488,601 B2 | 11/2022 | Bharadwaj | |
| 12,210,839 B1 * | 1/2025 | Burton | G06T 11/206 |
| 2017/0310615 A1 | 10/2017 | Su | |
| 2018/0052913 A1 | 2/2018 | Gaskill et al. | |
| 2021/0042662 A1 | 2/2021 | Pu et al. | |
| 2022/0189474 A1 | 6/2022 | Sharifi et al. | |
| 2022/0300708 A1 | 9/2022 | Cao et al. | |
| 2022/0366149 A1 | 11/2022 | Olson et al. | |
| 2023/0040095 A1 | 2/2023 | Shang et al. | |
| 2023/0252224 A1 * | 8/2023 | Tran | G06F 40/56 715/256 |

(Continued)

OTHER PUBLICATIONS

U.S. Appl. No. 63/499,489 to Burton, published as U.S. Pat. No. 12,210,839 (listed above) (Year: 2023).*

(Continued)

*Primary Examiner* — D'Arcy Winston Straub
(74) *Attorney, Agent, or Firm* — CANTOR COLBURN LLP; Jordan Schiller (57) ABSTRACT

Computer-implemented methods for a large language model privacy preservation system. Aspects include receiving prompt data from a user device. Aspects further include generating pre-processed prompt data using the prompt data from the user device. Aspects also include identifying a category for the pre-processed prompt data using topic modeling. Aspects include generating normalized prompt data using the pre-processed prompt data. Aspects further include storing the category and the normalized prompt data.

20 Claims, 4 Drawing Sheets

(56) References Cited

U.S. PATENT DOCUMENTS

| | | | | |
|---|---|---|---|---|
| 2023/0350929 | A1* | 11/2023 | Hasan | G06N 5/022 |
| 2024/0420012 | A1* | 12/2024 | Austin | G06N 20/00 |
| 2025/0068764 | A1* | 2/2025 | Joshi | G06F 40/20 |

OTHER PUBLICATIONS

Blei, et al, Blei, et al, "Latent Dirichlet Allocation", Journal of Machine Learning Research 3, 2003, pp. 993-1022.

Brown, et al, "Language Models are Few-Shot Learners", arXiv preprint, 2020, 75 pages.

Duan, et al, "Flocks of Stochastic Parrots: Differentially Private Prompt Learning for Large Language Models", arXiv preprint, 2023, 19 pages.

Feng, et al, "SecureNLP: A System for Multi-Party Privacy-Preserving Natural Language Processing", IEEE Transactions on Information Forensics and Security, 2020, 14 pages.

Greshake, et al, "Not What You've Signed Up for: Compromising Real-World LLM-Integrated Applications With Indirect Prompt Injection", arXiv preprint, 2023, 33 pages.

IBM Research, "AI Privacy Toolkit gets a boost on dataset assessment in latest release", https://research.ibm.com/blog/ai-privacy-toolkit, (Retrieved: Jul. 24, 2023), 5 pages.

Li, et al, "Privacy-Preserving Prompt Tuning for Large Language Model Services", arXiv preprint, 2023, 13 pages.

McAuley, et al, "Hidden factors and hidden topics: understanding rating dimensions with review text", In Proceedings of the 7th ACM conference on Recommender systems, 2013, pp. 165-172.

Mehmood, et al, "Protection of Big Data Privacy", IEEE Access, 2016, 12 pages.

Oumaima, et al, "A Survey on Blockchain and Artificial Intelligence Technologies for Enhancing Security and Privacy in Smart Environments", IEEE Access, 2022, 19 pages.

Radford, et al, "Language models are Unsupervised Multitask Learners", OpenAI blog, 2019, 24 pages.

Rao, et al, "Privacy preservation techniques in big data analytics: a survey", Journal of Big Data, 2018, 12 pages.

Vaswani, et al, "Attention is all you need", In Advances in Neural Information Processing Systems, 2017, 11 pages.

Vatsalan, et al, "Privacy Preserving Text Data Encoding and Topic Modelling", IEEE International Conference on Big Data, 2021, 9 pages.

Wang, et al, Wang, et al, "Privacy Protection in Using Artificial Intelligence for Healthcare: Chinese Regulation in Comparative Perspective", Healthcare, 2022, 19 pages.

Zhang, et al, Zhang, et al, "Enhancing Small Medical Learners With Privacy-Preserving Contextual Prompting", arXiv preprint, 2023, 27 pages.

Zhao, et al, "FedPrompt: Communication-Efficient and Privacy-Preserving Prompt Tuning In Federated Learning", arXiv preprint, 2023, 9 pages.

Zhou, et al, "Privacy Preserving Distributed Data Mining Based on Secure Multi-party Computation", IEEE 11th International Conference on Advanced Infocomm Technology, 2019, 6 pages.

\* cited by examiner

LARGE LANGUAGE MODEL PRIVACY PRESERVATION SYSTEM

BACKGROUND

The present invention generally relates to large language models, and more specifically, to computer systems, computer-implemented methods, and computer program products for a large language model privacy preservation system.

Recent advancements in natural language processing and artificial intelligence applications have been made due to the development of large language models. Large language models are a type of artificial intelligence that use deep learning techniques and large sets of data to generate human-like responses and assist in a variety of tasks. The storage and management of prompt data for large language models consumes substantial storage space and computational resources. Additionally, the storage of prompt data raises concerns about user privacy. Storing the prompt data could potentially reveal sensitive information about users and reduce user trust in the large language model. Existing solutions, such as data compression, encryption, federated learning, and differential privacy, present tradeoffs in efficiency, accuracy, and usability.

SUMMARY

Embodiments of the present invention are directed to a computer-implemented method for a large language model privacy preservation system. According to an aspect of the invention, a computer-implemented method includes receiving prompt data from a user device. The method also includes generating pre-processed prompt data using the prompt data from the user device. The method further includes identifying a category for the pre-processed prompt data using topic modeling. The method includes generating normalized prompt data using the pre-processed prompt data. The method also includes storing the category and the normalized prompt data.

In one embodiment of the present invention, generating the pre-processed prompt data further includes removing personally identifiable information from the prompt data. The method further includes tokenizing the prompt data, removing stop words from the prompt data, stemming the prompt data, and lemmatizing the prompt data.

In one embodiment of the present invention, identifying the category for the pre-processed prompt data further includes applying a Latent Dirichlet Allocation model to the pre-processed prompt data.

In one embodiment of the present invention, identifying the category for the pre-processed prompt data further includes applying a Non-Negative Matrix Factorization model to the pre-processed prompt data.

In one embodiment of the present invention, the method further includes identifying a second category for the pre-processed prompt data using the topic modeling and storing the second category and the normalized prompt data.

In one embodiment of the present invention, identifying the category for the pre-processed prompt data using topic modeling further includes generating a topic for the pre-processed prompt data using topic modeling and identifying the category corresponding to the topic.

According to another non-limiting embodiment of the invention, a system having a memory having computer readable instructions and one or more processors for executing the computer readable instructions, the computer readable instructions controlling the one or more processors to perform operations. The operations include receiving prompt data from a user device. The operations further include generating pre-processed prompt data using the prompt data from the user device. The operations also include identifying a category for the pre-processed prompt data using topic modeling. The operations further include generating normalized prompt data using the pre-processed prompt data. The operations also include storing the category and the normalized prompt data.

According to another non-limiting embodiment of the invention, a computer program product for a large language model privacy preservation system is provided. The computer program product includes a computer-readable storage medium having program instructions embodied therewith, the program instructions executable by a processor to cause the processor to perform operations The operations include receiving prompt data from a user device. The operations further include generating pre-processed prompt data using the prompt data from the user device. The operations also include identifying a category for the pre-processed prompt data using topic modeling. The operations further include generating normalized prompt data using the pre-processed prompt data. The operations also include storing the category and the normalized prompt data.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

DETAILED DESCRIPTION

Disclosed herein are methods, systems, and computer program products for a large language model privacy preservation system that prioritizes user privacy in prompt data stored and utilized by large language models. As discussed above, large language models are a type of artificial intelligence that use deep learning techniques and large sets of data to generate human-like responses and assist in a variety of tasks. Examples of such tasks include, but are not limited to, text generation, translations, content summary, speech recognition, machine translations, information retrieval, and the like. Large language models can identify patterns in prompt data, such as frequently asked questions, ethical concerns, and other issues. Large language models require a large dataset of prompt data to train and fine-tune their parameters. Prompt data are natural language text that include instructions for the large language model and can also include examples, contextual information, and user input.

The storage and management of prompt data poses a challenge for large language models, as large language models require vast amounts of data, consuming substantial storage space and computational resources. Additionally, user concerns about their prompt data being stored and analyzed by external entities can discourage users from using large language models. Existing solutions, such as data compression, encryption, federated learning, and differential privacy, present tradeoffs in efficiency, accuracy, and usability.

The systems and methods described herein are directed to privacy preservation in the prompt data used for prompt engineering and model fine-tuning in natural language processing and artificial intelligence. By leveraging the privacy preserving systems and methods described herein, a wide range of downstream applications can utilize prompt data that protects user privacy for various purposes, including personalized content recommendations, quality control, refined model training, optimized system resources, and research in natural language processing and sentiment analysis.

A large language model privacy preservation system receives prompt data from a user device and pre-processes the prompt data to remove any personally identifiable information or sensitive content. The system uses topic modeling techniques to categorize the pre-processed prompt data based on their content. The system generates normalized prompt data that does not include any personally identifiable information or sensitive content and discards the literal prompt data from the user. The category and normalized prompt data are stored for use by applications or external entities.

Unlike data compression, the large language model privacy preservation system does not compromise information quality. Unlike encryption, it avoids the computational overhead associated with encryption and decryption processes. When compared to federally governed learning and differential privacy, the large language model privacy preservation system offers a straightforward and manageable mechanism for privacy preservation, without sacrificing the data's usability. The large language model privacy preservation system provides a unique approach that optimizes system resources and enhances user privacy.

The large language model privacy preservation system achieves a balance between privacy preservation and useful data extraction. Traditional methods require storing and analyzing literal prompts, often compromising user privacy. The systems and methods described herein utilize anonymized prompt data and their associated categories for a variety of purposes, such as personalized content recommendations, quality control, refined model training, resource optimization, and research in natural language processing and sentiment analysis, all without infringing on user privacy. The prioritization of user privacy and ethical considerations for the systems and methods described herein, enhances the functionality and value of large language models. By effectively safeguarding user privacy, the system actively encourages increased utilization of large language models, thereby facilitating more effective human-machine communication.

Various aspects of the present disclosure are described by narrative text, flowcharts, block diagrams of computer systems, and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
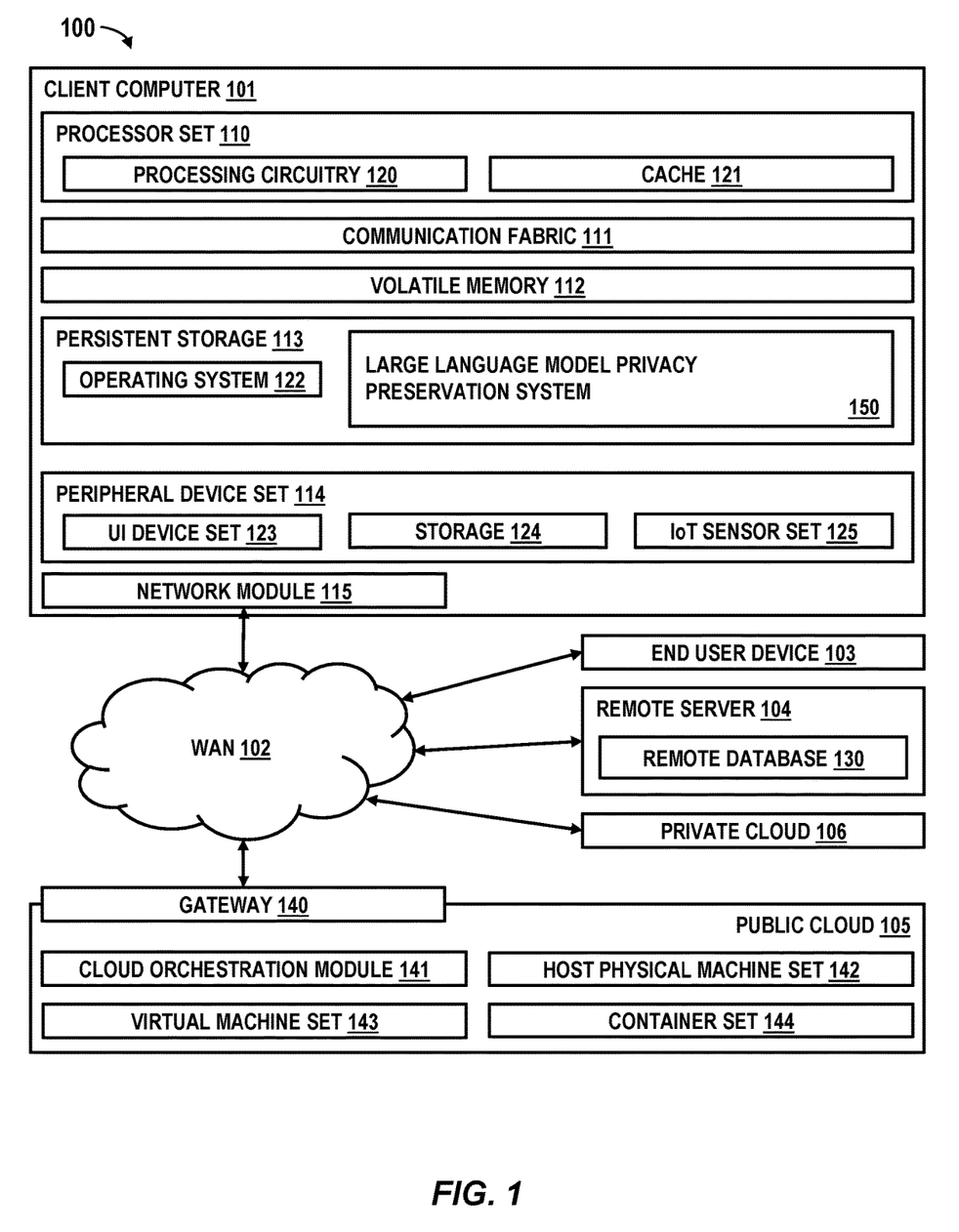
FIG. 1 depicts a block diagram of an example computer system for use in conjunction with one or more embodiments of the present invention.

Referring now to FIG. 1, computing environment 100 contains an example of an environment for the execution of at least some of the computer code involved in performing the inventive methods, such as using topic modeling on prompt data to preserve privacy for storing and using prompt data in a large language model by a large language model privacy preservation system 150. In addition to the large language model privacy preservation system 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and the large language model privacy preservation system 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Client computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in the large language model privacy preservation system 150 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface type operating systems that employ a kernel. The code included in the large language model privacy preservation system 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collects and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
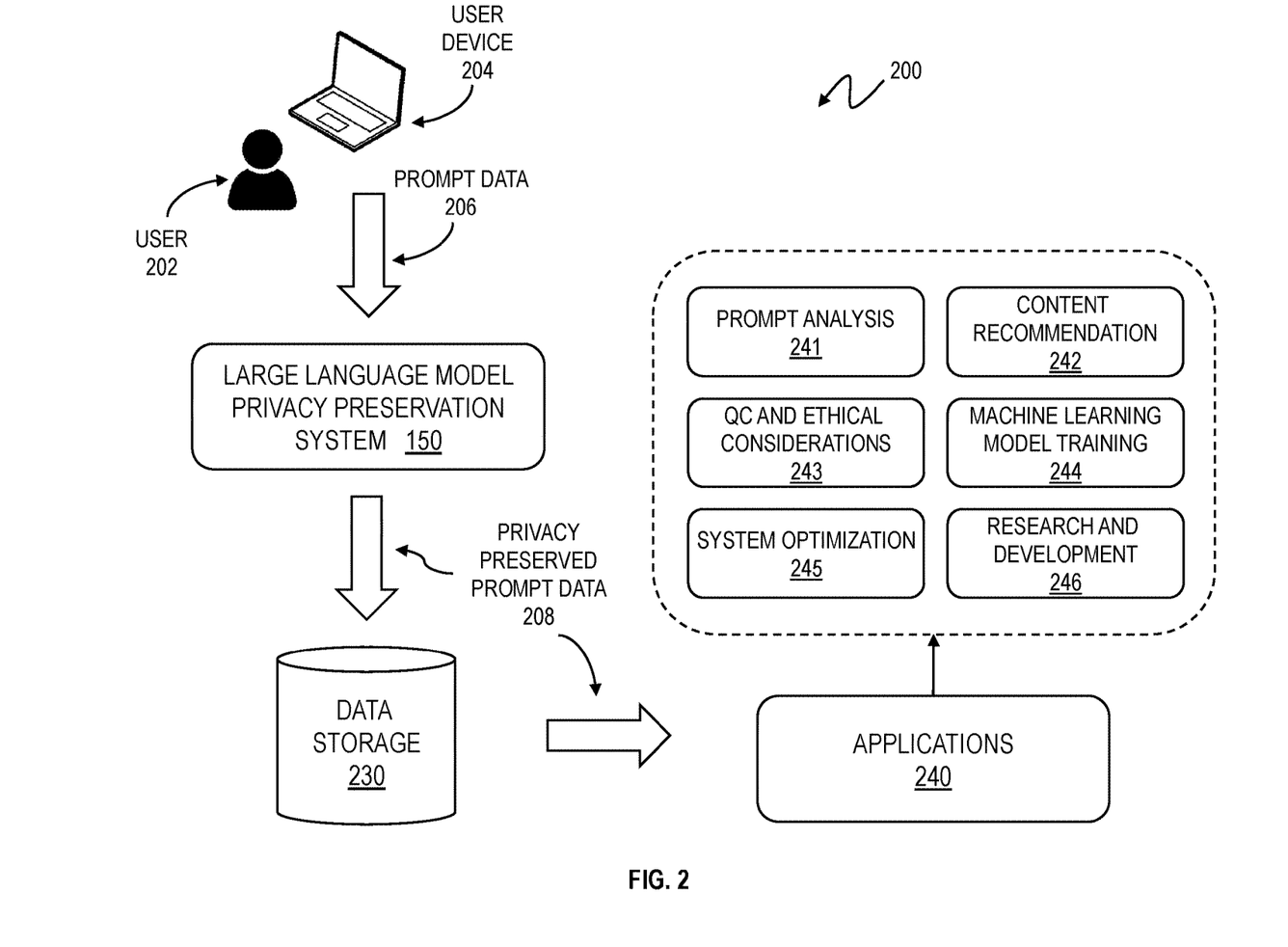
FIG. 2 is a data flow diagram depicting the flow of data in a large language model privacy preservation system in accordance with one or more embodiments of the present invention.

Referring now to FIG. 2, a data flow diagram depicts the flow of data and its transformation through a system 200 that includes a large language model privacy preservation system 150 in accordance with one or more embodiments of the present invention. A user 202 interacts a user device 204, such as a desktop computer, laptop computer, cell phone, tablet, or the like, to create prompt data 206. Prompt data 206 is natural language text that includes instructions for a large language model to perform a task and can include examples, contextual information, and user input as well as the instructions. The user device 204 transmits the prompt data 206 to the large language model privacy preservation system 150.

The large language model privacy preservation system 150 receives the prompt data 206 from the user device 204. The prompt data 206 is cleaned to remove sensitive or personally identifiable information and to remove information that is irrelevant to topic modeling techniques. This includes removing punctuation, stop words, stemming, and lemmatization of the prompt data 206.

Stop words are usually the most common words in a language (such as articles, prepositions, pronouns, conjunctions, etc.) that do not add much value to the content of natural language text. Removing stop words from natural language text before analysis removes low-level information from the content to focus on the important content. Removal of stop words from prompt data 206 prior to analysis reduces the dataset size and thus the time needed for computational operation. Examples of stop words in English are "the", "a", "an", "so", "what", etc.

Stemming is the process of reducing identified words to their word stem or base by removing either the first or last few characters of the word using a list of frequent prefixes and suffixes. The results are a shorter form of the word even if that form does not have any meaning. For example, the words "finally" and "finale" are replaced by "fina" and "programming", "programmer", and "programs" are reduced down to the stem "program." Stemming reduces the number of unique words that need to be processed, thereby increasing performance of the algorithm. Stemming enables words with similar meanings to be grouped together despite their distinct forms.

Lemmatization is the process used in natural language processing to reduce identified words to their root word or "lemma" based on the context of the word. For example, lemmatization determines where the identified word falls in a sentence, the intended part of speech of the identified word, and context from the sentence it is located, surrounding sentences, or the like. Lemmatization includes performing analysis on identified words to remove only inflectional ends and converting the words to their base or dictionary form of the word. For example, the words "swimming", "swims", and "swam" are mapped to the lemma "swim." Lemmatization is generally more accurate than stemming but is computationally more expensive than stemming due to morphological analysis and conversion of the identified words to their lemma rather than merely trimming the word.

The large language model privacy preservation system 150 applies topic modeling to the pre-processed prompt data to identify one or more topics of the prompt data 206 based on its content. Topic modeling is a natural language processing technique that identifies one or more topics or themes based on the content of the data by identifying patterns of word and phrase clusters and frequencies of words in the data. Topic modeling is a text-mining tool for discovery of hidden semantic structures in a body of text.

The large language model privacy preservation system 150 identifies one or more categories based on the topics or themes identified by the topic modeling analysis. The large language model privacy preservation system 150 also transforms the prompt data 206 received from the user device 204 into a normalized form. The normalized form of the prompt data 206 retains the key elements of the data without any personally identifiable information or sensitive content. The transformation of the prompt data 206 to privacy preserved prompt data 208 preserves the semantic essence of the prompt data 206, while excluding user-specific details and personally identifiable information that could potentially compromise privacy.

Now referring to Table 1, depicted below, shows the transformation of different example prompt data 206. In Example 1, the large language model privacy preservation system 150 receives prompt data 206 from a user device 204. The prompt data 206 is the statement "I am trying to learn Python. Could you suggest any resources?" During the pre-processing of the prompt data 206, stop words and punctuation are removed. The prompt data 206 also undergoes stemming and lemmatization, producing the statement "try learn Python suggest resources" for topic modeling. The large language model privacy preservation system 150 identifies the topic or theme "Programming" by applying topic modeling to the pre-processed statement. The large language model privacy preservation system 150 determines that the category P001 corresponds to the identified topic. The large language model privacy preservation system 150 also generates a normalized statement "User is seeking Python learning resources" and then stores the identified category and normalized statement in the datastore 230.

Similarly in Example 2 of Table 1, the large language model privacy preservation system 150 receives the prompt data 206 "How's the weather in New York?" The statement "How weather New York" is generated through pre-processing and the topic "Weather Information" is identified through topic modeling techniques applied by the large language model privacy preservation system 150. The large language model privacy preservation system 150 determines that "Weather Information" corresponds to the category code W001. The normalized statement "User inquiring about New York weather" is generated by the large language model privacy preservation system 150. The large language model privacy preservation system 150 stores the category and the normalized prompt data in the datastore 230.

In Example 3, the large language model privacy preservation system 150 receives the prompt data 206 "My name is John Doe. I am struggling with depression. What should I do?" The large language model privacy preservation system 150 pre-processes the statements and removes personally identifiable information (i.e., "John Doe"), removes punctuation and stop words, and applies stemming and lemmatization to generate "[user redacted] struggle depression What should", which is then analyzed using topic modeling techniques. The large language model privacy preservation system 150 identifies "Mental Health" as the topic of the prompt data 206 and determines that the category MH001 corresponds to the identified topic. The large language model privacy preservation system 150 also generates "User seeking help for mental health issues" as the normalized prompt data. In some embodiments, "depression" can be determined to be sensitive or personally identifiable information and is replaced by a more generic term "mental health." The large language model privacy preservation system 150 stores the category and normalized prompt data to the datastore 230.

TABLE 1

| | Transformation of Example Prompt Data | | |
|---|---|---|---|
| Step | Example 1 | Example 2 | Example 3 |
| Receive prompt data from user | "I am trying to learn Python. Could you suggest any resources?" | "How's the weather in New York?" | "My name is John Doe. I am struggling with depression. What should I do?" |
| Pre-Processing Prompt Data | "try learn Python suggest resources" | "How weather New York" | "[user redacted] struggle depression What should" |

TABLE 1-continued

Transformation of Example Prompt Data

| Step | Example 1 | Example 2 | Example 3 |
| --- | --- | --- | --- |
| Topics identified by Topic Modeling | Programming | Weather Information | Mental Health |
| Prompt Data Categorization | P001 | W001 | MH001 |
| Prompt Data Normalization | "User seeking Python learning resources" | "User inquiring about New York weather" | "User seeking help for mental health issues" |
| Data Storage | (P001, "User is seeking Python learning resources") | (W001, "User inquiring about New York weather") | (MH001, "User seeking help for mental health issues") |

The large language model privacy preservation system 150 transmits the privacy preserved prompt data 208 that includes the categories and normalized prompts to data storage 230. Data storage 230 can be any type of storage device or system as described herein.

Applications 240 and external entities utilize the privacy preserved prompt data 208 for different purposes. For example, an application 240 uses the privacy preserved prompt data 208 for prompt analysis 241. The application 240 for prompt analysis 241 includes detailed analysis of the privacy preserved prompt data 208 to understand user preferences, frequently discussed topics, emerging trends, or patterns in usage of prompt data 206. An application 240 uses the privacy preserved prompt data 208 for content recommendations 242. By leveraging the categorized prompts in the data storage 230, an application 240 makes accurate and personalized content recommendations 242 to users by identifying prompt data with similar topics or categories and recommending relevant content, such as articles, tutorials, resources, or suggested actions based on the interests or needs of the user. For example, an application 240 can identify resources to learn the Python programming language for Example 1 of Table 1, such as websites or tutorials, recommended textbooks, and the like. In Example 2 of Table 1, an application 240 can retrieve weather information for the past month in New York in response to the prompt data 206. In Example 3 of Table 1, an application 240 can provide contact information for local mental health assistance organizations as well as informative articles regarding how to find mental health professionals or steps to improve mental health.

In some embodiments, an application 240 uses the privacy preserved prompt data 208 for quality control and ethical considerations 243. For example, the application 240 monitors and enforces quality control measures on the privacy preserved prompt data 208 stored in the data storage 230. The application 240 evaluates the normalized prompts within specific categories to ensure that they meet ethical guidelines or adhere to predetermined standards. The application 240 identifies prompts that may be inappropriate, offensive, or require human intervention for further review.

In some embodiments, an application 240 uses the privacy preserved prompt data 208 for machine learning model training 244. The categorized prompts of the privacy preserved prompt data 208 are used to improve existing models or develop new models. By incorporating categorized prompts during the training process, the models can learn from the patterns and structures of prompts associated with specific topics, enhancing their ability to generate relevant and contextually appropriate responses.

In another embodiment, an application 240 performs system optimization 245 using the privacy preserved prompt data 208. The analysis of the categorized prompts can provide insights into the distribution of topics, allowing for efficient allocation of computational resources to manage frequently discussed topics or optimize response generation for specific categories. This optimization can enhance the overall system performance and responsiveness.

In some embodiments, an application 240 can leverage the privacy preserved prompt data 208 for research and development 246. The categorized prompts can support research in natural language processing, machine learning, sentiment analysis, topic modeling, and other areas related to human-machine interactions to gain a deeper understanding of user behavior, preferences, and language usage patterns.

Figure 3:
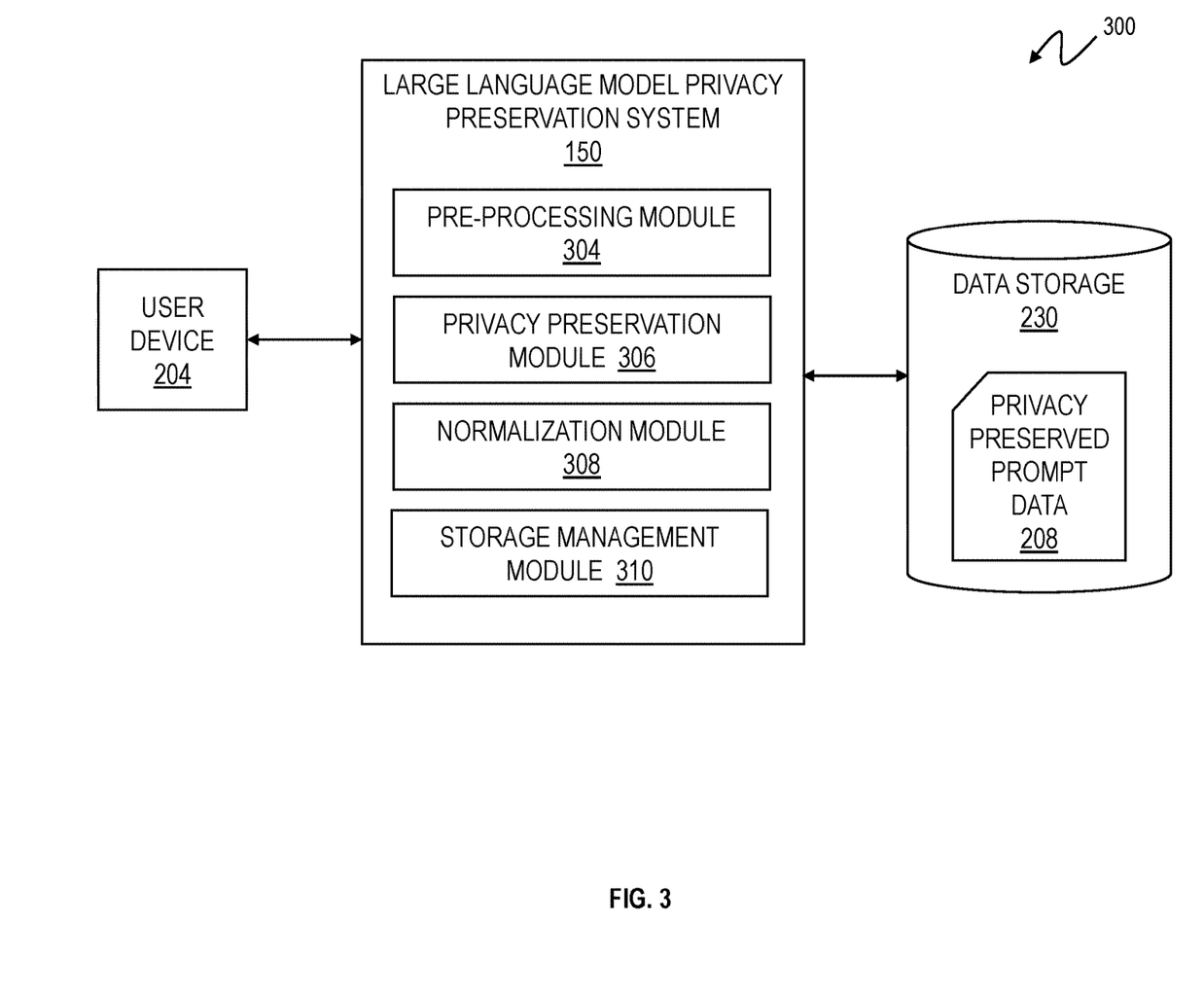
FIG. 3 is a block diagram of a system for a large language model privacy preservation system in accordance with one or more embodiments of the present invention.

Referring now to FIG. 3, a system 300 for a large language model privacy preservation system in accordance with one or more embodiments of the present invention is shown. In exemplary embodiments, the system 300 includes a large language model privacy preservation system 150 that may be embodied in a computer 101, such as the one shown in FIG. 1. As illustrated, the system 300 includes a large language model privacy preservation system 150 that is associated with one or more user devices 204. The large language model privacy preservation system 150 is configured to receive and process prompt data 206 from one or more user devices 204 and analyze and process the prompt data 206 to produce privacy preserved prompt data 208 for a large language model. The large language model privacy preservation system 150 includes a pre-processing module 304, a privacy preservation module 306, a normalization module 308, and a storage management module 310. The large language model privacy preservation system 150 stores data, such as the privacy preserved prompt data 208, in or associated with data storage 230.

A user device 204 generates and transmits prompt data 206 to the large language model privacy preservation system 150. The pre-processing module 304 of the large language model privacy preservation system 150 receives the prompt data 206 and pre-processes the prompt data 206 to generate pre-processed prompt data. The pre-processing module 304 removes personally identifiable information, such as a names, addresses, birthdates, or the like from the prompt data 206. The pre-processing module 304 removes stop words and punctuation from statements in the prompt data 206 and performs stemming and lemmatization for the words in the prompt data 206. The pre-processed prompt data is transmitted to the privacy preservation module 306.

The privacy preservation module 306 applies one or more topic modeling techniques to the pre-processed prompt data to identify a topic or theme based on the content of the prompt data 206. The privacy preservation module 306 identifies one or more categories corresponding to the topic or themes determined by the topic modeling techniques.

The normalization module 308 uses the pre-processed prompt data to generate normalized prompt data. In some embodiments, the normalization module 308 uses one or more machine learning techniques to transform the pre-processed prompt data into a human readable statement that retains the key elements of the original prompt data 206 necessary for a language model to generate a relevant response, but without any personally identifiable information or sensitive content.

The storage management module 310 receives the categories generated by the privacy preservation module 306 and the normalized prompt data generated by the normalization module 308. In some embodiments, the storage management module 310 generates a data object to store the privacy preserved prompt data 208, which includes the category and the normalized prompt data. The storage management module 310 transmits the privacy preserved prompt data 208, stored in the data object, to the data storage 230. In some embodiments, the category is used as a primary key or tag for the data object. Applications 240 can then access and utilize the privacy preserved prompt data 208 stored in the data storage 230 to use as permitted and necessary.

Figure 4:
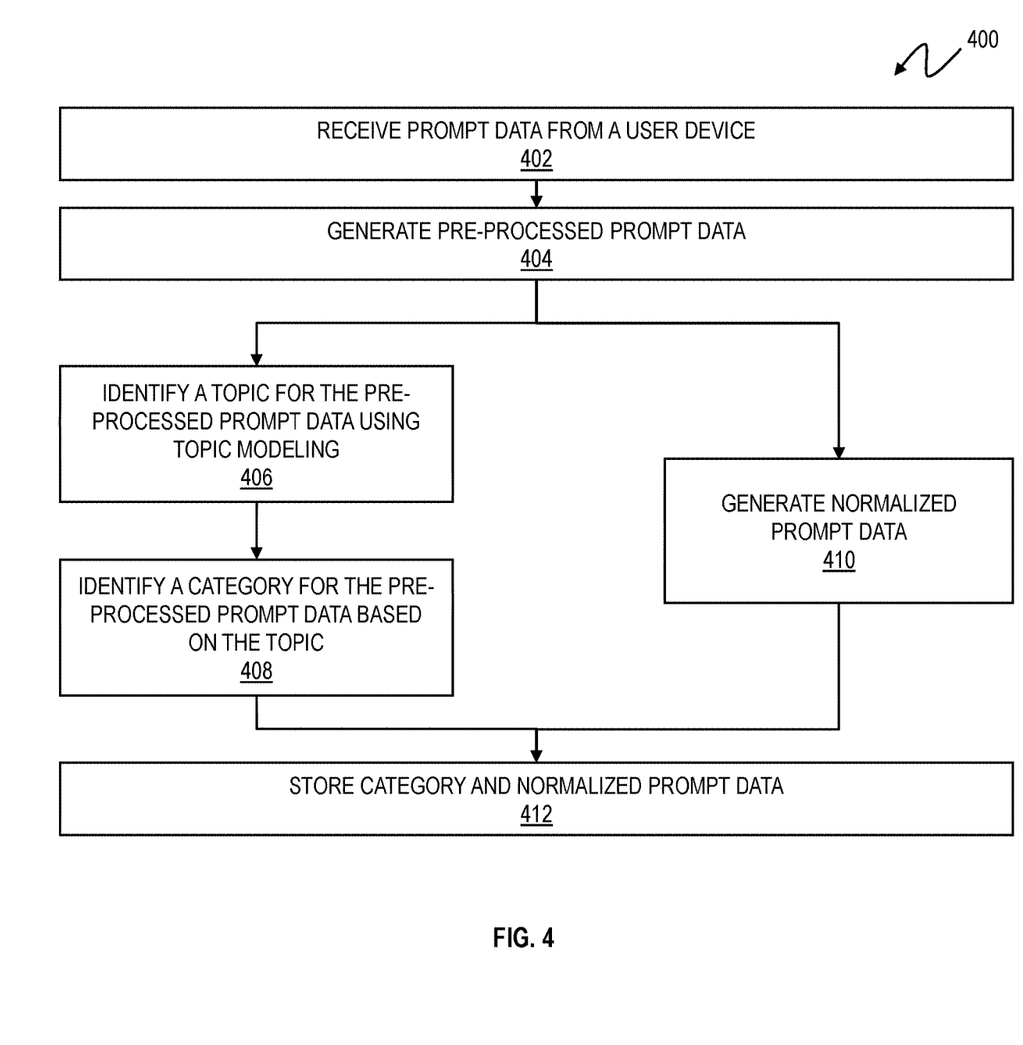
FIG. 4 is a flowchart of a method for preserving privacy in prompt data by a large language model privacy preservation system in accordance with one or more embodiments of the present invention.

Referring now to FIG. 4, a flowchart of a method 400 for preserving privacy in prompt data 206 by a large language model privacy preservation system 150 in accordance with one or more embodiments of the present invention is shown. The method 400 begins at block 402 by receiving prompt data 206 from a user device 204. In some embodiments, the pre-processing module 304 receives the prompt data 206 from the user device 204. In some embodiments, the prompt data 206 is collected from an application or website accessed by the user device 204 and a user 202 directly provides the prompt data 206. In some embodiments, prompt data 206 is collected from various sources, such as the email, chat log, or social media platform of the user 202 by the user device 204. In some embodiments, the prompt data 206 is collected from public forums, customer service interactions, or the like by the user device 204. The user device 204 transmits the prompt data 206 to the large language model privacy preservation system 150.

Next at block 404, the method 400 includes generating pre-processed prompt data. In some embodiments, the pre-processing module 304 prepares the prompt data 206 received from the user device 204 for topic modeling. The pre-processing module 304 removes personally identifiable information, such as the name, address, identification number (e.g., social security number, driver's license number, etc.). In some embodiments, removing personally identifiable information involves using regular expressions or another method to detect and remove personally identifiable information. In some embodiments, the pre-processing module 304 tokenizes the prompt data 206 into words or phrases. In some embodiments, the pre-processing module 304 removes stop words and punctuations from the prompt data 206. The pre-processing module 304 applies stemming and/or lemmatization to the prompt data 206. In some embodiments, the pre-processing module 304 converts the text of the prompt data 206 into a suitable format for topic modeling, such as a document-term matrix or TF-IDF representation.

Next at block 406, the method 400 includes identifying a topic using the pre-processed prompt data. In some embodiments, the privacy preservation module 306 receives or obtains the pre-processed prompt data from the pre-processing module 304. The privacy preservation module 306 applies one or more topic modeling techniques, such as the Latent Dirichlet Allocation model, the Non-Negative Matrix Factorization model, or other type of topic modeling model, to the pre-processed prompt data. The privacy preservation module 306 generates one or more topics using the topic modeling techniques based on the content of the pre-processed prompt data.

Next at block 408, the method 400 includes identifying a category for the pre-processed prompt data based on the topic generated by the topic modeling techniques, such as those generated in block 406. A category is a representation of the theme or topic of the prompt data 206. The category can be a code, word, or phrase that is representative of the theme or topic of the prompt data 206. In some embodiments, the categories are provided by a system administrator of the system 300. The categories can be generated by machine-learning techniques.

In some embodiments, the privacy preservation module 306 identifies one or more categories that correspond to the topics generated through topic modeling. In some embodiments, the privacy preservation module 306 uses probabilities that are estimated and provided by the topic modeling technique to determine the category that corresponds to the topics.

Next at block 410, the method 400 includes generating normalized prompt data. The normalization module 308 transforms the pre-processed prompt data generated by the pre-processing module 304. The normalized prompt data retains the key elements of the prompt data 206 received from the user device 204 necessary for applications 240 and/or language models to generate a relevant response. The normalized prompt data does not contain any personably identifiable information or sensitive content. In some embodiments, the normalization module 308 generates the normalized prompt data using one or more machine learning techniques or language models.

Next at block 412, the method 400 includes storing the privacy preserved prompt data 208. In some embodiments, the storage management module 310 generates a data structure, such as a data object, to store the privacy preserved prompt data 208. The privacy preserved prompt data 208 includes the one or more categories identified by the privacy preservation module 306 and the normalized prompt data generated by the normalization module 308. In some embodiments, the category is used as a tag for the structure or as a primary key for the data structure, which can be used to quickly find and access data structure by an application 240 or third-party entity. In some embodiments, if there are multiple categories for a data prompt, the storage management module 310 generates a unique data structure for each category and stores each category and the normalized prompt data to a respective data structure.

Applications 240 and third-party entities can use the stored privacy preserved prompt data 208 in the data storage 230 for different purposes. Examples of how the applications 240 or third-party entities can use the privacy preserved prompt data 208 include, but are not limited to, quality control, refined model training, optimizing system resources, conducting research in natural language processing and sentiment analysis, content recommendation, and the like.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram, or the steps (or operations) described therein without departing from the spirit of the disclosure. For instance, the actions can be performed in a differing order or actions can be added, deleted, or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
    receiving prompt data from a user device for processing by a large language model;
    generating pre-processed prompt data using the prompt data from the user device, wherein generating the pre-processed prompt data comprises detecting personally identifiable information (PII) in the prompt data, substituting each detected PII instance with a placeholder token, and removing sensitive information and irrelevant information including punctuation and stop words;
    deleting the original prompt data from volatile memory upon completion of the substitution of detected PII with placeholder tokens, such that only the redacted prompt data remains in memory;
    identifying a category for the pre-processed prompt data using topic modeling, wherein the topic modeling identifies topics based on patterns of word and phrase clusters and frequencies of words in the pre-processed prompt data;

generating normalized prompt data using the pre-processed prompt data, wherein the normalized prompt data retains key elements of the prompt data while preserving semantic essence without personally identifiable information; and storing the category and the normalized prompt data by generating a data object containing both the category and the normalized prompt data, and storing only the data object in a category-indexed datastore for use in large language model applications including personalized content recommendations, quality control, refined model training, resource optimization, and research in natural language processing, wherein the original prompt data is not retained in any storage after deletion from volatile memory.

2. The computer-implemented method of claim 1, wherein generating the pre-processed prompt data further comprises removing personally identifiable information from the prompt data, stemming the prompt data, and lemmatizing the prompt data.

3. The computer-implemented method of claim 2, further comprising tokenizing the prompt data;
removing stop words from the prompt data;
stemming the prompt data; and
lemmatizing the prompt data.

4. The computer-implemented method of claim 1, wherein identifying the category for the pre-processed prompt data further comprises applying a Latent Dirichlet Allocation model to the pre-processed prompt data.

5. The computer-implemented method of claim 1, wherein identifying the category for the pre-processed prompt data further comprises applying a Non-Negative Matrix Factorization model to the pre-processed prompt data.

6. The computer-implemented method of claim 1, further comprising:
identifying a second category for the pre-processed prompt data using the topic modeling; and
storing the second category and the normalized prompt data.

7. The computer-implemented method of claim 1, wherein identifying the category for the pre-processed prompt data using topic modeling further comprises:
generating a topic for the pre-processed prompt data using topic modeling; and
identifying the category corresponding to the topic.

8. A system comprising:
a memory having computer readable instructions; and
one or more processors for executing the computer readable instructions, the computer readable instructions controlling the one or more processors to perform operations comprising:
receiving prompt data from a user device for processing by a large language model;
generating pre-processed prompt data using the prompt data from the user device, wherein generating the pre-processed prompt data comprises detecting personally identifiable information (PII) in the prompt data, substituting each detected PII instance with a placeholder token, and removing sensitive information and irrelevant information including punctuation and stop words;

deleting the original prompt data from volatile memory upon completion of the substitution of detected PII with placeholder tokens, such that only the redacted prompt data remains in memory;

identifying a category for the pre-processed prompt data using topic modeling, wherein the topic modeling identifies topics based on patterns of word and phrase clusters and frequencies of words in the pre-processed prompt data;

generating normalized prompt data using the pre-processed prompt data, wherein the normalized prompt data retains key elements of the prompt data while preserving semantic essence without personally identifiable information; and storing the category and the normalized prompt data by generating a data object containing both the category and the normalized prompt data, and storing only the data object in a category-indexed datastore for use in large language model applications including personalized content recommendations, quality control, refined model training, resource optimization, and research in natural language processing, wherein the original prompt data is not retained in any storage after deletion from volatile memory.

9. The system of claim 8, wherein the operations to generate the pre-processed prompt data further comprise:
removing personally identifiable information from the prompt data, stemming the prompt data, and lemmatizing the prompt data.

10. The system of claim 9, wherein the operations further comprise:
tokenizing the prompt data;
removing stop words from the prompt data;
stemming the prompt data; and
lemmatizing the prompt data.

11. The system of claim 8, wherein the operations to identify the category for the pre-processed prompt data further comprise applying a Latent Dirichlet Allocation model to the pre-processed prompt data.

12. The system of claim 8, wherein the operations to identify the category for the pre-processed prompt data further comprise applying a Non-Negative Matrix Factorization model to the pre-processed prompt data.

13. The system of claim 8, wherein the operations further comprise:
identifying a second category for the pre-processed prompt data using the topic modeling; and
storing the second category and the normalized prompt data.

14. The system of claim 8, wherein to identify the category for the pre-processed prompt data using topic modeling, the operations further comprise:
generating a topic for the pre-processed prompt data using topic modeling; and
identifying the category corresponding to the topic.

15. A computer program product comprising a computer readable storage medium having program instructions embodied therewith, the program instructions executable by a processor to cause the processor to perform operations comprising:
receiving prompt data from a user device for processing by a large language model;
generating pre-processed prompt data using the prompt data from the user device, wherein generating the pre-processed prompt data comprises detecting personally identifiable information (PII) in the prompt data, substituting each detected PII instance with a placeholder token, and removing sensitive information and irrelevant information including punctuation and stop words;

deleting the original prompt data from volatile memory upon completion of the substitution of detected PII with placeholder tokens, such that only the redacted prompt data remains in memory;

identifying a category for the pre-processed prompt data using topic modeling, wherein the topic modeling identifies topics based on patterns of word and phrase clusters and frequencies of words in the pre-processed prompt data;

generating normalized prompt data using the pre-processed prompt data, wherein the normalized prompt data retains key elements of the prompt data while preserving semantic essence without personally identifiable information; and storing the category and the normalized prompt data by generating a data object containing both the category and the normalized prompt data, and storing only the data object in a category-indexed datastore for use in large language model applications including personalized content recommendations, quality control, refined model training, resource optimization, and research in natural language processing, wherein the original prompt data is not retained in any storage after deletion from volatile memory.

16. The computer program product of claim 15, wherein the operations to generate the pre-processed prompt data further comprise:
removing personally identifiable information from the prompt data, stemming the prompt data, and lemmatizing the prompt data.

17. The computer program product of claim 16, wherein the operations further comprise:
tokenizing the prompt data;
removing stop words from the prompt data;
stemming the prompt data; and
lemmatizing the prompt data.

18. The computer program product of claim 15, wherein the operations to identify the category for the pre-processed prompt data further comprise applying a Latent Dirichlet Allocation model to the pre-processed prompt data.

19. The computer program product of claim 15, wherein the operations to identify the category for the pre-processed prompt data further comprise applying a Non-Negative Matrix Factorization model to the pre-processed prompt data.

20. The computer program product of claim 15, wherein the operations further comprise:
identifying a second category for the pre-processed prompt data using the topic modeling; and
storing the second category and the normalized prompt data.

* * * * *